United States Patent

[11] 3,545,661

[72] Inventor Tommy Dale Cody
Garland, Texas
[21] Appl. No. 757,701
[22] Filed Sept. 5, 1968
[45] Patented Dec. 8, 1970
[73] Assignee Texas Instruments Incorporated
Dallas, Texas
a corporation of Delaware

[54] METHOD OF AND APPARATUS FOR REMOVING WIRE PIGTAILS
23 Claims, 3 Drawing Figs.

[52] U.S. Cl. .......... 225/1, 225/93; 29/413
[51] Int. Cl. .......... B26f 3/00
[50] Field of Search .......... 225/1, 2, 93; 81/3; 29/413; 140/139, 140

[56] References Cited
UNITED STATES PATENTS
1,920,641 3/1933 Heichert .......... 225/2
3,122,293 2/1964 Joa .......... 225/93
3,268,137 8/1966 Martin .......... 225/2
3,396,758 8/1968 Hall .......... 140/140X

*Primary Examiner*—Frank T. Yost
*Attorneys*—Samuel M. Mims, James O. Dixon, Andrew M. Hassell, Harold Levine, Melvin Sharp, Gerald B. Epstein, John E. Vandigriff and Koenig, Senniger, Powers and Leavitt

ABSTRACT: A method of and apparatus for removal of pigtails of wire which result from ball bonding of wires to a semiconductor element on a transistor header and stitch bonding of the wires to the upper ends of leads extending through the header. The method involves repeatedly subjecting the pigtails to vacuum to effect repetitive bending of the pigtails until they break off, and the apparatus involves a vacuum head slidable on a combination header clamp and vacuum head guide for effecting the repetitive bending of the pigtails.

Tommy Dale Cody
Inventor
Koenig, Senniger,
Powers and Leavitt,
Attorneys

METHOD OF AND APPARATUS FOR REMOVING WIRE PIGTAILS

This invention relates to a method of and apparatus for removing wire pigtails, and more particularly to a method of and apparatus for removing wire pigtails from semiconductor devices.

The invention is especially concerned with, though not limited to, the removal of pigtails of wire extending from the leads of headers for transistors. It will be understood that, in a typical transistor, a semiconductor element is enclosed in a metal case which is constituted by a header or eyelet and a cover sealed thereto. The semiconductor element may be mounted on a lead (the base lead) extending through the header, and wires (usually gold wires) are interconnected between the semiconductor element and leads (the collector and emitter leads) extending through the header. The wire interconnections between the semiconductor element and the collector and emitter leads are often made by techniques such that pigtails of wire are left extending from the upper ends of the collector and emitter leads. If these pigtails are allowed to remain, they may come into contact with the metal case of the transistor and cause shorts. Hence, they must be removed.

Heretofore, the most satisfactory mode of removing the pigtails from a header (the operation of removal being referred to as "pigtailing") has been by manual procedure involving use of tweezers, but this has been extremely slow and tedious. Operators using tweezers are generally unable to obtain production rates greater than 750 units per hour. Various mechanized modes of pigtailing have been attempted, but none has been found wholly satisfactory.

Accordingly, among the several objects of this invention may be noted the provision of an improved method of and apparatus for effecting pigtailing, particularly for pigtailing transistor headers, though applicable to pigtailing of other units, with a minimum of labor and at high production rates; and the provision of such a method and apparatus which effectively removes the pigtails without causing damage to the headers, and which facilitates reclamation of the removed pigtails (as is desirable when the pigtails are gold wire pigtails, for example). In general, the method of the invention involves repeatedly subjecting a pigtail to a vacuum to effect repetitive bending of the pigtail until it breaks off, and the apparatus comprises means for holding a unit (e.g., a transistor header) having a pigtail and a suction device mounted for movement relative to one another repeatedly to bring the suction device into and out of proximity to the pigtail for the stated purpose. Other objects and features will be in part apparent and in part pointed out hereinafter.

In the accompanying drawing, in which one of various possible embodiments of the invention is illustrated:

Corresponding reference characters indicate corresponding parts throughout the drawing.

Figure 3:
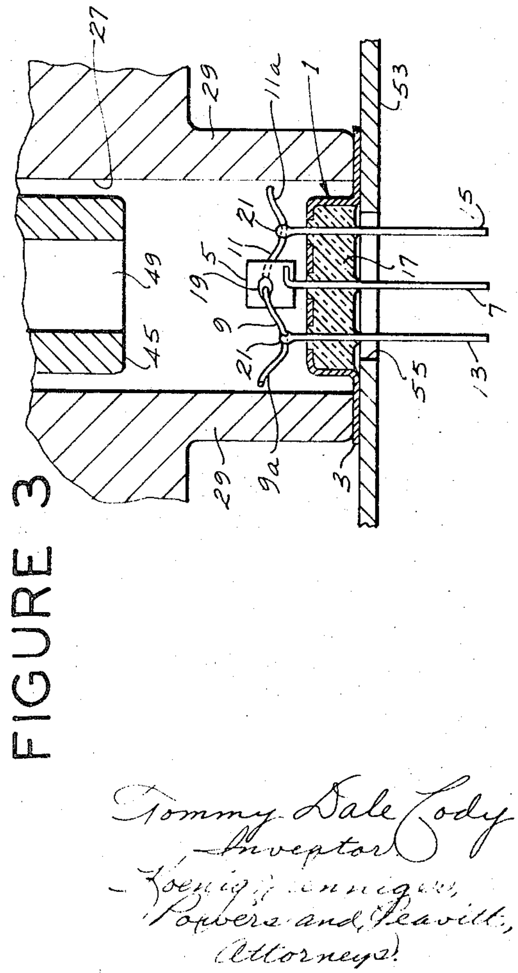
FIG. 3 is an enlarged fragment of FIG. 2.

Referring first more particularly to FIG. 3 of the drawing, there is indicated at 1 a so-called header or eyelet of a transistor, typically comprising an inverted cup-shaped sheet metal member having an outwardly projecting rim 3 at its bottom. A semiconductor element 5 (e.g., a wafer) is mounted on the upper end of a lead 7 which extends through the top of the header. Wires 9 and 11 are interconnected between the semiconductor element and leads 13 and 15 extending through the top of the header. A sealant is provided in the cup portion of the header as indicated at 17. It will be understood that a cup-shaped sheet metal cover (not shown) is ultimately sealed to the header to enclose element 5. Wires 9 and 11 are generally gold wires. Each wire is applied, in known manner, by ball bonding one end of a continuous length of wire to the semiconductor element 5, as indicated at 19, and stitch bonding the wire to the upper end of the respective lead 13 or 15, as indicated at 21. Ball bonding and stitch bonding are well known in the art. When the continuous length of wire is stitch bonded to the upper end of a lead, a new ball must be formed with a torch farther along the wire to make a subsequent ball bond, and the wire cut at the new ball. This inherently leaves a pigtail of wire extending from the upper end of the lead to which the wire is connected. These pigtails are indicated at 9*a* and 11*a* in FIG. 3. They must be removed to avoid the possibility that they will contact the subsequently applied cover.

Figure 1:
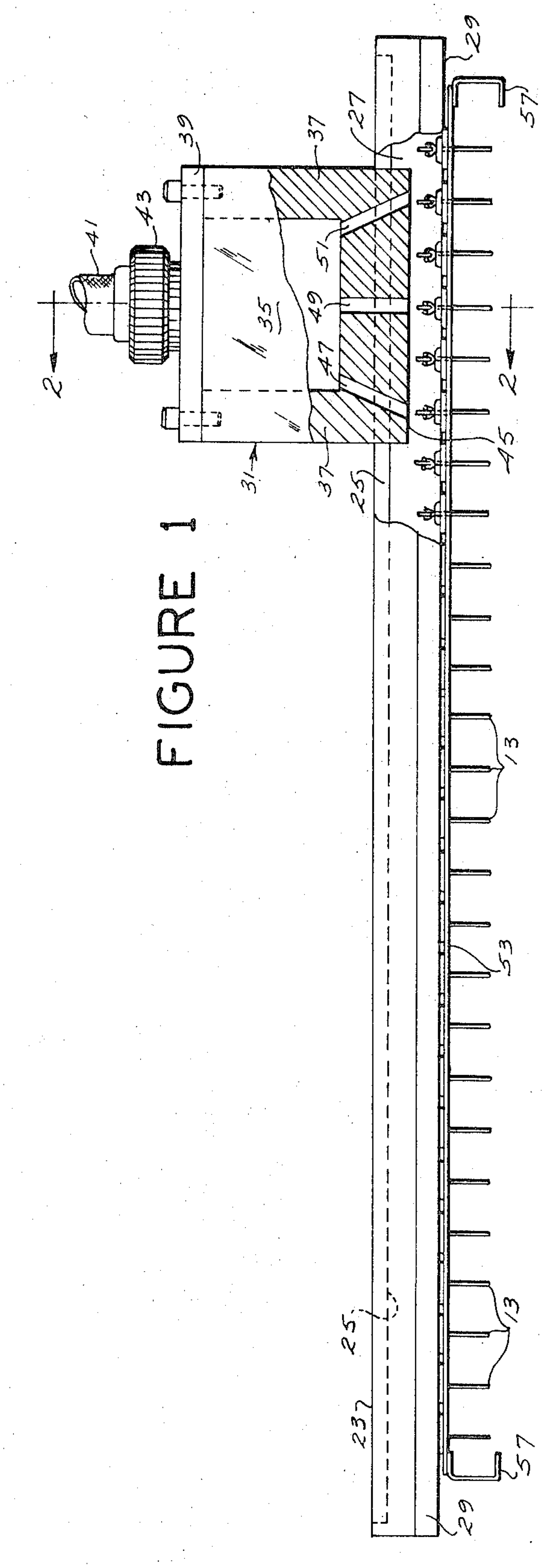
FIG. 1 is a view in side elevation with parts broken away and shown in section of an apparatus made in accordance with this invention for removing pigtails from headers.
Figure 2:
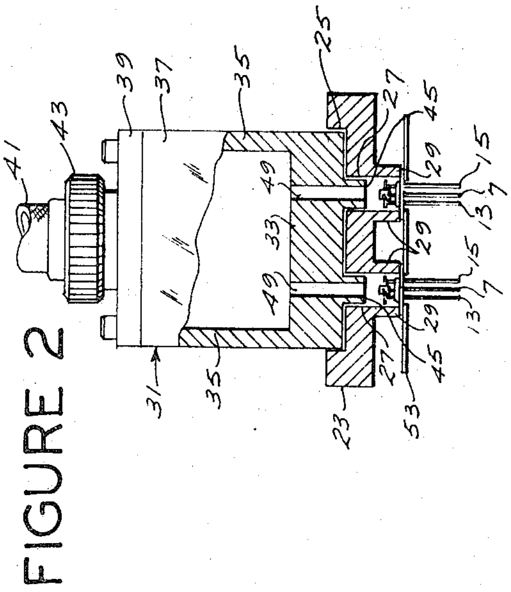
FIG. 2 is a view partially in transverse section on line 2–2 of FIG. 1.

Now referring more particularly to FIGS. 1 and 2, apparatus of this invention for removing pigtails 9*a* and 11*a* is shown to comprise an elongate generally flat rectangular bar 23 having a width considerably greater that its thickness. In one face of this bar, constituting its upper face as illustrated, is a relatively wide and shallow groove 25 extending lengthwise of the bar from near one of its ends to near its other end. The bar is provided with two side-by-side parallel slots each designated 27 extending lengthwise thereof from near one end to near the other, these slots extending completely through the bar from the bottom of the groove. It is also formed with ribs 29 extending down from its bottom face on opposite sides of the slots, these ribs extending from one end of the bar to the other.

A suction device or vacuum head 31 is guided for sliding movement along the top of the bar in the groove 25. This device is in the form of a box, having a relatively thick bottom 33, sidewalls 35, end walls 37 and a top 39. It is considerably shorter in length than the bar. A flexible vacuum hose 41 is suitably connected to the top of the head as indicated at 43. This hose may be connected to the suction inlet of a conventional vacuum cleaner, or to any other suitable means for drawing a vacuum in the head 31. The box has a pair of side-by-side parallel tongues 45 extending downward from its bottom which are slidable in the slots 27. Three suction ports 47, 49 and 51 extend through the bottom of the box and the tongue 45 at one side of the box and three similar ports extend through the bottom of the box and the tongue 45 at the other side of the box. Each port 49 is centrally located and extends vertically. Ports 47 and 51 are inclined outward in downward direction toward the ends of the box.

At 53 is indicated a carrier or tray for holding headers 1 having pigtails such as 9*a* and 11*a* to be removed, in rows extending parallel to one another spaced apart a distance corresponding to the spacing of slots 27 in the bar 23. As herein illustrated, the carrier 53 consists simply of a plate having rows of openings 55 for the header leads 7, 13 and 15, the rims 3 of the headers bearing on the plate around these openings and the header leads extending down through the openings. The plate has suitable supports such as indicated at 57.

To remove the pigtails from the headers on a carrier or tray 53, the bar 23 is placed on the carrier 53 over two rows of headers 1 as shown in FIGS. 1 and 2, with the headers in one row received in one of the slots 27 and the headers in the other row received in the other slot 27. The ribs 29 on opposite sides of the slots bear down on the rims 3 of the headers and clamp them down against the carrier 53. With vacuum applied to the vacuum head via the hose 41, the head is reciprocated back and forth in relatively rapid short strokes, starting, for example, at one end of the bar 23 (its right end as shown in FIG. 1) and gradually progressing to the other end of the bar. As a result of the short-stroke reciprocation of the head, and the stated progression of the head along the bar while continuing the short-stroke reciprocation, the lower end of each suction port 47, 49 and 51 is repeatedly moved into and out of proximity to the pigtails 9*a* and 11*a* on each header 1. This results in repetitive bending or whipping of the pigtails at points adjacent the stitch bonds 21, and the bending or whipping causes work hardening of the wires at these points. The head is reciprocated a sufficient number of times over each header to effect sufficient work hardening of the wires so that, ultimately, the pigtails break off. The broken-off pigtails are sucked out and may be readily reclaimed (e.g., by providing a screen to trap the pigtails in the head).

It will be observed that the bar 23 serves two functions, the first being that of a holding means or clamp for holding or clamping the headers down on the carrier 53 so that they will not be pulled up when the vacuum head passes over them, and the second being that of a guide for slidably guiding the vacuum head for reciprocation. It will also be observed that, with the three suction ports 47, 49 and 51 extending through the bottom of the head (including the tongues 45) spaced at intervals in the direction of its reciprocation, each pigtail is subjected to vacuum three times during each stroke in each direction of the head.

In actual operation, it has been found that satisfactory results were obtained in pigtailing headers in which wires 9 and 11 were .007-mil gold wires by reciprocating the vacuum head in relatively short strokes and progressing it along the bar 23 in the such manner that each header was passed over about twenty times. On the average, 98percent of the pigtails were successfully removed, with no damage whatsoever to any of the headers. As distinguished from the prior production rate of 750 per operator per hour for tweezer-type operations, as above noted, by use of the present invention one operator, running two pigtailers of this invention at the same time, may pigtail approximately 10,000 headers per hour, without any damage to the headers as may be caused by the tweezers. A further advantage of the use of the present invention is that, if there should be any defective stitch bonds 21, the vacuum pigtailing will pull the wires off the heads, and these defective headers may be readily segregated and rejected.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawing shall be interpreted as illustrative and not in a limiting sense.

I claim:

1. The method of removing a pigtail of wire from a unit made with such a pigtail comprising repeatedly subjecting the pigtail to a vacuum to effect repetitive bending of the pigtail until it breaks off.

2. The method of claim 1 wherein the pigtail is repeatedly subjected to vacuum by effecting relative movement between a suction device and the pigtail to bring the suction device into and out of proximity to the pigtail.

3. The method of claim 2 wherein the unit having the pigtail is held stationary and the suction device is moved.

4. The method of claim 3 wherein the suction device is reciprocated back and forth adjacent the pigtail.

5. The method of claim 4 wherein the suction device is reciprocated back and forth over a row of said units.

6. The method of claim 5 wherein the suction device is reciprocated back and forth in short strokes less than the length of the row and progressed along the row.

7. The method of removing from transistor headers pigtails of wire remaining after wires are stitch bonded to the ends of leads of the headers comprising effecting relative movement between a row of headers and a suction device repeatedly to bring the suction device into and out of proximity to the pigtails until the pigtails break off and are sucked away.

8. The method of claim 7 wherein the headers are held stationary and the suction device is reciprocated back and forth over the row of headers.

9. The method of claim 8 wherein the suction device is reciprocated back and forth in short strokes less than the length of the row and progressed along the row.

10. The method of claim 9 wherein a pigtail is subjected to vacuum a plurality of times during each stroke in each direction of the suction device over the pigtail.

11. Apparatus for removing a pigtail of wire from a unit having such a pigtail comprising means for holding a unit and a suction device mounted for movement relative to one another repeatedly to bring the suction device into and out of proximity to the pigtail and thereby repeatedly to subject the pigtail to a vacuum to effect repetitive bending of the pigtail until it breaks off.

12. Apparatus as set forth in claim 11 wherein said holding means constitutes a clamp for the unit and said suction device is mounted for movement on the holding means.

13. Apparatus as set forth in claim 12 wherein the suction device is mounted for reciprocation on the holding means, the latter constituting a guide for the suction device.

14. Apparatus as set forth in claim 13 wherein the suction device is constituted by a box having a flexible vacuum hose connected thereto and a plurality of suction ports spaced at intervals in the direction of its reciprocation for subjecting the pigtail to vacuum a number of times during each stroke in each direction of the suction device.

15. Apparatus as set forth in claim 11 wherein the holding means is elongated to hold a plurality of units arranged in a row for removal of pigtails therefrom.

16. Apparatus as set forth in claim 15 wherein the elongate holding means constitutes a clamp for clamping the units in the row against a carrier and the suction device is mounted for reciprocation lengthwise of the holding means.

17. Apparatus as set forth in claim 16 wherein the holding means is formed to guide the suction device for sliding movement lengthwise thereof.

18. Apparatus as set forth in claim 17 wherein the suction device is constituted by a box having a flexible vacuum hose connected thereto and a plurality of suction ports spaced at intervals in the direction of its reciprocation for subjecting pigtails on the units to vacuum a number of times during each stroke in each direction of the box.

19. Apparatus for removing from transistor headers pigtails of wire remaining after wires are stitch bonded to the ends of leads of the headers, and adapted for operation on a row of headers mounted in a header carrier, said apparatus comprising an elongate bar having a slot extending lengthwise thereof, said bar being applicable to the carrier with the headers accommodated in the slot, the bottom of the bar being engageable with rims of the headers to clamp them against the carrier, and a suction device slidable along the top of the bar having at least one suction port in communication with the slot.

20. Apparatus as set forth in claim 19 wherein the bar has a groove in the top and the suction device comprises a box slidable in the groove having the suction port in its bottom and wherein a flexible vacuum hose is connected to the box.

21. Apparatus as set forth in claim 20 wherein the box has a tongue slidable in the slot, the suction port extending through the tongue.

22. Apparatus as set forth in claim 21 wherein there are a plurality of suction ports extending through the bottom of the box and the tongue spaced at intervals along the length of the tongue.

23. Apparatus as set forth in claim 22 wherein the bar has a second slot parallel to the first-mentioned slot and the box has a second tongue slidable in the second slot, and a plurality of suction ports extending through the bottom of the box and the second tongue spaced at intervals along the length of the second tongue.